(12) United States Patent
Lochkovic et al.

(10) Patent No.: US 6,370,305 B2
(45) Date of Patent: Apr. 9, 2002

(54) OPTICAL FIBER ARRAYS

(76) Inventors: Gregory A. Lochkovic, 1140 McDowell Cir., Conover, NC (US) 28613; Norman Andrew Punch, Jr., 4008 N. Center St. #307; Brunhilde Hagemeister, 339 8$^{th}$ Ave. Dr. NW., both of Hickory, NC (US) 28601

( * ) Notice: Subject to any disclaimer, the term of this patent is extended or adjusted under 35 U.S.C. 154(b) by 0 days.

(21) Appl. No.: 09/854,651

(22) Filed: May 14, 2001

Related U.S. Application Data

(63) Continuation of application No. 09/280,240, filed on Mar. 29, 1999, now Pat. No. 6,253,013.

(51) Int. Cl.$^7$ .................................................. G02B 6/44

(52) U.S. Cl. .......................... 385/114; 428/375; 427/516

(58) Field of Search .......................... 385/101–114, 115; 428/374, 375, 378; 427/516, 517; 65/385, 408, 409

(56) References Cited

U.S. PATENT DOCUMENTS

| | | | | |
|---|---|---|---|---|
| 6,054,217 A | * | 4/2000 | Szum et al. | 428/392 |
| 6,122,428 A | * | 9/2000 | Duecker | 385/115 |
| 6,175,677 B1 | * | 1/2001 | Yang et al. | 385/114 |

* cited by examiner

*Primary Examiner*—Hemang Sanghavi
(74) *Attorney, Agent, or Firm*—Timothy J. Aberle

(57) ABSTRACT

An optical fiber array (20,40) comprising at least one subunit (26,46) including at least one optical fiber (22) therein surrounded by a respective subunit matrix (23,43) having a subunit matrix modulus characteristic. The optical fiber array (20,40) includes a common matrix (24,44) disposed adjacent to the at least one subunit (26,46) and having a common matrix modulus characteristic. A subunit/common matrix modulus ratio being defined as a ratio of the subunit matrix modulus characteristic with respect to the common matrix modulus characteristic, the subunit/common matrix modulus ratio being greater than about 1.5:1. The optical fiber array (20,40) can include an adhesion zone (28,48) defining a controlled adhesion bond between the common and subunit matrices (24,26;44,46).

6 Claims, 1 Drawing Sheet

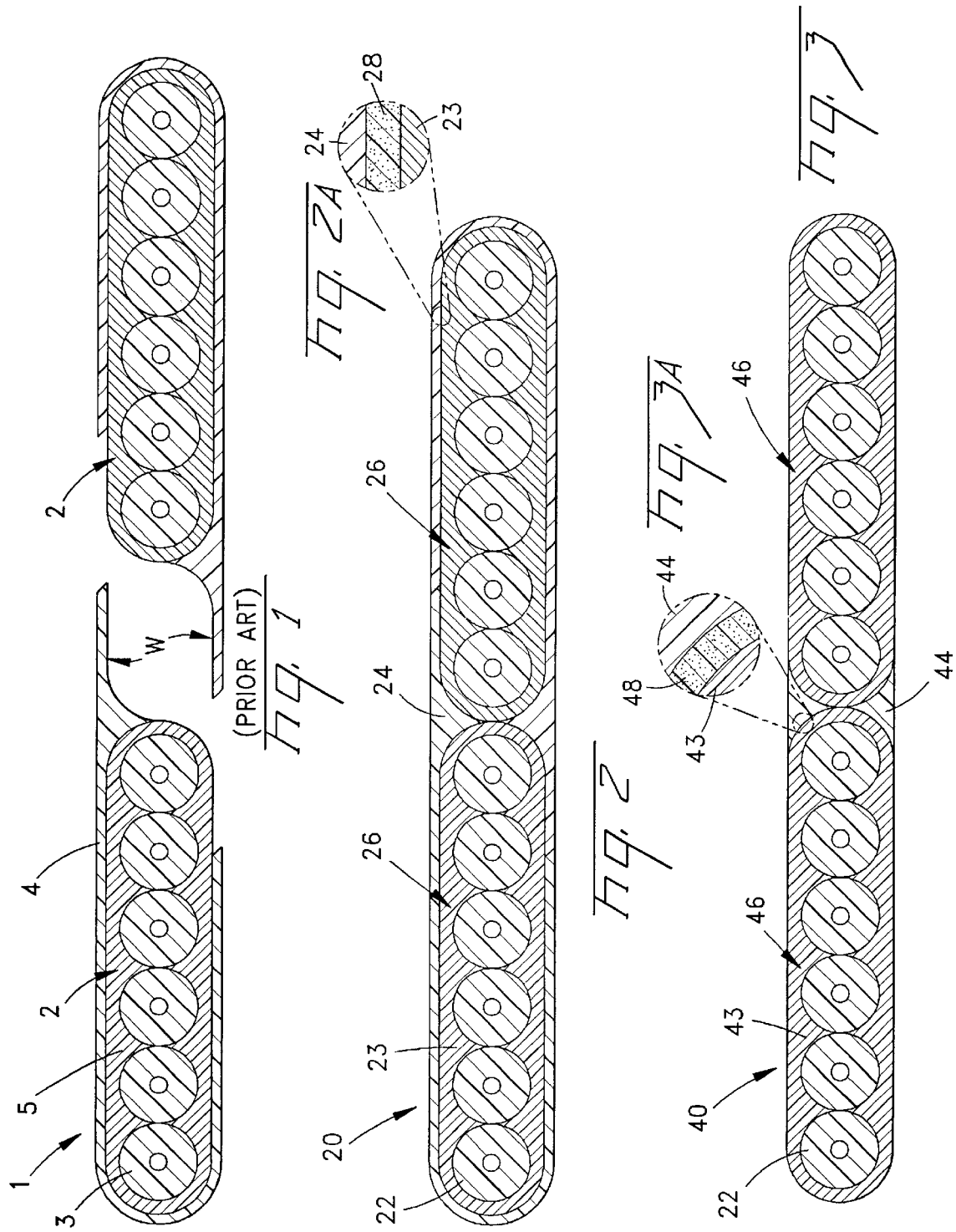

OPTICAL FIBER ARRAYS

This application is a continuation of U.S. Ser. No. 09/280,240 filed Mar. 29, 1999 now U.S. Pat. No. 6,253,013.

The present invention relates to arrays of optical fibers and, more particularly, to optical fiber ribbons.

General Construction of an Optical Fiber Ribbon

Optical fiber ribbons are used to transmit telecommunication, computer, and data information. The general structure of an optical fiber ribbon, and the materials and processing variables applied in the manufacture of an optical fiber ribbon can play a significant role in how an optical fiber ribbon will perform in the field. Optical fiber ribbon structures can be generally classified into two general categories, namely, ribbons without subunits and ribbons including subunits. A ribbon/subunit design typically includes a subunit with at least one optical fiber surrounded by a subunit matrix that, in turn, is surrounded by a common matrix that also surrounds at least one other subunit.

An optical fiber ribbon without subunits can present problems for the craft. For example, when separating optical fiber ribbons that do not contain subunits into optical fiber subsets, the craft must use expensive precision tools. Moreover, connectorization/splice procedures can require inventories of specialized splice and closure units/tools for the various subsets of optical fibers. Where the craft elects to separate the optical fiber ribbon into subsets by hand, or with a tool lacking adequate precision, stray optical fibers can result. Stray optical fibers can cause problems in optical ribbon connectorization, organization, stripping, and splicing. An exemplary optical fiber ribbon 1 is shown in FIG. 1. Optical fiber ribbon 1 includes subunits 2 having optical fibers 3 disposed in a subunit matrix 5 and surrounded by a common matrix 4. Optical fiber ribbons having subunits can have several advantages, for example, improved separation, and avoidance of stray fiber occurrences. Additionally, optical fiber ribbons having subunits can result in a reduction of the overall cable diameter so that high fiber-density networks can be achieved. However, one handling concern is the potential formation of wings W (FIG. 1) during hand separation of the subunits. This can be caused by a lack of sufficient adhesion between common matrix 4 and subunit matrix 5. The existence of wings W can negatively affect, for example, optical ribbon organization, connectorization, stripping, and splicing operations by the craft. Additionally, wings W can cause problems with ribbon identification markings, or compatibility of the subunit with ribbon handling tools, for example, thermal strippers, splice chucks, and fusion splicers.

UV Materials in Ribbon Construction

Organic materials of the ultra-violet light curable (UV curable) type, and visible light curable type, have been developed for use as a base resin for subunit and common matrices. UV curable materials are generally tough, exhibit high resistance to abrasion, perform well when under stress, and are adaptable to mass production processes. When cured, a UV curable subunit matrix typically has a modulus of about $10^6$ Pa, and a UV curable common matrix should have a relatively higher modulus of about $10^9$ Pa.

Review of UV Curing Process in Ribbon Manufacture

The curing of a UV radiation-curable composition suitable for use as a subunit or common matrix material is essentially a polymerization of the UV curable material, whereby the material undergoes a transition from a liquid to a solid. Prior to application to an optical fiber or a subunit, the UV curable material comprises a mixture of formulations of liquid monomers, oligomer "backbones" with, e.g., acrylate functional groups, photoinitiators, and other additives. Photoinitiators function by: absorbing energy radiated by the UV or visible light source; fragmenting into reactive species; and then initiating a polymerization/hardening reaction of the monomers and oligomers. The result is, in general, a solid network of crosslinking between the monomers and oligomers that may include fugitive components after cure. The photoinitiator therefore begins a chemical reaction, that promotes the solidification of the liquid matrix to form a generally solid film having modulus characteristics.

A key to the curing process is the reaction of a photoinitiator in response to UV radiation. A photoinitiator has an inherent absorption spectrum that is conveniently measured in terms of absorbance as a function of the wavelength of the radiated light. Each photoinitiator has a characteristic photoactive region, i.e., a photoactive wavelength range (typically measured in nanometers (nm)). Commercially available photoinitiators may have a photoactive region in the vacuum ultra-violet (VUV)(160–220 nm), ultra-violet (UV)(220–400 nm), or visible light (V-light)(400–700 nm) wavelength range. When the material is irradiated by a VUV, UV or V-light lamp, that emits light in the photoactive region, the material will cure.

In the application of a UV radiation curable material as a subunit or common matrix, light intensity and cure time are factors by which the resultant modulus of the film can be controlled. The light dose, i.e., the radiant energy arriving at a surface per unit area, is inversely proportional to line speed, i.e., the speed the radiation curable material moves under a radiation source. The light dose is the integral of radiated power as a function of time. In other words, all else being equal, the faster the line speed the higher the radiation intensity must be to achieve adequate curing. After a radiation curable material has been fully irradiated, the material is said to be cured. Curing occurs in the radiation curable material from the side facing the radiation source down or away from the source. Because portions of the material closer to the light source can block light from reaching non-cured portions of the material, a cure gradient may be established. Depending on the amount of incident light, a cured material may therefore exhibit different degrees of cure, and the degrees of cure in a film can have distinct modulus characteristics associated therewith.

Thus the degree of cure affects the mechanical characteristics through the cross link density of the material. For example, a significantly cured material may be defined as one with a high cross link density for that material, and may, for example, be too brittle. Further, an undercured material may be defined as one having a low cross link density, and may be too soft, possibly causing an undesirable level of ribbon friction.

Optical fiber ribbons with subunits and a common matrix with general modulus characteristics may define a backdrop for the present invention. For example, EP-A-856761 discloses a ribbon having a common matrix surrounding discrete single-fiber optical subunits each including a respective subunit matrix. Each subunit matrix includes six tension wires formed of aramid fiber, glass fiber, or steel. The modulus of the common matrix can be set lower than that of the subunit matrix. This design is disadvantageous because the tension wires are expensive, add thickness and stiffness to the ribbon as a whole, and can present significant manufacturing difficulties. Moreover, single-fiber subunits have limited transmission capabilities.

In addition to surrounding single-fiber subunits, the common matrix can have a high modulus thereby defining a relatively rigid protective outer layer. For example, EP-A 843187 discloses a ribbon having a multi-layer common matrix with an outer protective layer. The layers of the common matrix have differing rigidness characteristics. The common matrix can have a modulus of 5 to 100 kg/mm$^2$, and the subunit resin layer can be the same material as the common matrix. A rigid outer layer is also discussed in an *International Wire & Cable Symposium* paper entitled "ANALYSIS OF A MODULAR 24-FIBER RIBBON FOR THE DISTRIBUTION NETWORK" (1998). The ribbon discussed therein includes a pair of subunits surrounded by a common matrix. The common matrix is more rigid than the subunit matrix for strengthening the structure of the ribbon. In addition, protective matrix layers with a relatively high modulus are disclosed in JP-A-80-62466 and JP-A-91-13773.

Moreover, the common matrix can exhibit predefined friction characteristics. For example, EP-A-822432 discloses a pair of subunits surrounded by a common matrix including a base resin material having a functional group of low compatibility dispersed therein. The functional group forms discrete domains of about 5 microns in diameter in the common matrix. The domains have a low modulus relative to the base resin of the common matrix for lowering the coefficient of friction (COF) of the common matrix. Another example of a COF effect is disclosed in U.S. Pat. No. 5,524,164, wherein part of the optical fiber ribbon includes a component of poor compatibility forming a discontinuous phase having a low modulus in the outer resin layer surrounding a pair of subunits. The component of poor compatibility is intended to migrate to the ribbon outer surface for reducing sliding friction.

OBJECT(S) OF THE INVENTION

It is an object of the present invention to provide an optical fiber array having: at least one subunit including at least one optical fiber therein surrounded by a respective subunit matrix having a subunit matrix modulus; a common matrix disposed adjacent to the at least one subunit having a common matrix modulus; a subunit/common matrix modulus ratio being defined as a ratio of the subunit matrix modulus with respect to the common matrix modulus; the subunit/common matrix modulus ratio being about 1.5:1 or more.

It is an object of the present invention to provide an optical fiber array having at least one subunit including at least two optical fibers therein surrounded by a respective subunit matrix having a subunit matrix modulus; a common matrix disposed adjacent to the at least one subunit having a common matrix modulus; the subunit matrix modulus being unequal to the common matrix modulus whereby the common matrix is less rigid than the subunit matrix.

It is an object of the present invention to provide an optical fiber array an optical fiber array having: at least one optical fiber ribbon with at least two optical fibers therein surrounded by a respective first matrix having a subunit matrix modulus; an second matrix disposed adjacent to the at least one subunit having a matrix modulus; the subunit matrix modulus being unequal to the second matrix modulus whereby the second matrix is less rigid than the first matrix.

It is an object of the present invention to provide an optical fiber array having: at least one subunit including at least one optical fiber therein surrounded by a respective subunit matrix; a common matrix disposed adjacent to the at least one subunit; an adhesion zone defining a controlled adhesion bond between the common and subunit matrices that is robust enough to inhibit inadvertent separation of the subunits but is weak enough to avoid breakage of the subunit matrix during subunit separation.

It is an object of the present invention to provide an optical fiber array having: at least one subunit including at least one optical fiber therein surrounded by a respective subunit matrix having a subunit matrix modulus; a common matrix disposed adjacent to the at least one subunit having a common matrix modulus; a subunit/common matrix modulus ratio being defined as a ratio of the subunit matrix modulus with respect to the common matrix modulus; the subunit/common matrix modulus ratio being greater than about 1.5:1; and an adhesion zone defining a controlled adhesion bond between the common and subunit matrices.

It is an object of the present invention to provide a method of manufacturing an optical fiber array comprising the steps of:

(a) supplying at least one subunit including at least one optical fiber therein surrounded by a respective subunit matrix;

(b) creating a common matrix adjacent to the at least one subunit and curing the common matrix so that a common matrix modulus of the common matrix is less than a subunit matrix modulus of the subunit matrix; and (c) prior to and during curing of the common matrix, defining an adhesion zone between the common and subunit matrices that is robust enough to inhibit inadvertent separation of the subunit but is weak enough to minimize breakage of the subunit matrix during subunit separation.

The step of defining the adhesion zone can include oxidizing an outer surface of the subunit matrix. The oxidation can be accomplished by Corona treatment of the subunit matrix. In addition, the step of defining the adhesion zone can include reacting the common matrix with polar groups made by an oxidation of the outer surface of the at least one subunit. Moreover, the step of defining the adhesion zone can include applying and curing a bonding treatment, and subsequent application and curing of the common matrix. Further, the step of defining the adhesion zone can include, in combination, the steps of oxidizing an outer surface of the subunit and applying a bonding treatment thereto.

BRIEF DESCRIPTION OF THE DRAWING FIGURES

FIG. 1 is a cross sectional view of an optical fiber ribbon according to the background of the present invention.

FIG. 2 is a cross sectional view of an optical fiber ribbon according to the present invention.

FIG. 3 is a cross sectional view of an optical fiber ribbon according to the present invention.

DETAILED DESCRIPTION OF THE INVENTION

The concepts of the present invention can be used to manufacture arrays of optical fibers arranged together, for example, generally planar optical fiber ribbons 20,40 (FIGS. 2–3). Key features of optical fiber ribbons made according to the present invention comprise the adhesion of the common matrix to the subunits, and/or the Young's modulus characteristics of the subunit and common matrices. Optical ribbons 20,40 are robust to cable processing, and include a low attenuation after cabling operations. In addition, optical ribbons 20,40 are robust to handling by the craft, including consistent separability by hand or tool into optical fiber sub-units and the avoidance of stray fibers or wings.

Each optical fiber ribbon 20,40 includes respective optical fibers 22. A typical optical fiber 22 includes a silica-based core that is operative to transmit light and is surrounded by a silica-based cladding having a lower index of refraction than the core. A soft primary coating surrounds the cladding, and a relatively rigid secondary coating surrounds the primary coating. Optical fibers can be, for example, single mode or multi-mode optical fibers made commercially available by Corning Incorporated.

Optical fiber ribbons 20,40 include respective subunits 26,46 each having respective subunit matrix layers 23,43 in which optical fibers 22 are disposed. A common matrix 24 surrounds each subunit 26 (FIG. 2), and a common matrix 44 is interposed between facing sides of subunits 46 (FIG. 3). As further described below, adhesion zones 28,48 are respectively defined between respective subunit and common matrices 23,24 and 43,44 (shown schematically in FIGS. 2A,3A).

In general, subunits 26,46 can be made by arranging optical fibers 22 generally in parallel and extruding a UV curable, subunit matrix material therearound and curing it with a UV radiation source. Next, a UV curable common matrix 24 is extruded around and circumscribes subunits 26 thereby defining optical fiber ribbon 20. A UV curable common matrix 44 can be applied to facing sides of subunits 46 thereby defining optical fiber ribbon 40. In either event, common matrices 24,44 can be cured with a UV radiation source. The UV radiation source may be an H or a D bulb: an H bulb is preferred for establishing a cure gradient and better peelability, and a D bulb is preferred where it is desired to have minimum cure gradient. In a preferred embodiment, the respective formulations of common matrices 24,44 may comprise a UV curable acrylate material including a photoinitiator. Alternatively, common matrices 24,44 can include a photoinitiator having a photoactive peak absorbance in the relatively long wavelength UV spectrum. For example, common matrix layers 24,44 can include a one or more photoinitiators having an alpha-hydroxy-ketone material and a phenyl phosphine oxide derivative, for example, DAROCURE 4265 (HMPP/TPO) (270–290 nm), made commercially available by Ciba, or another suitable photointiator. Additionally, for enhancing strippabilty/peelability of subunit matrix 23,43 with respect to optical fibers 22, optical fiber ribbons 20,40 may include respective release layers (not shown) between optical fibers 22 and respective subunit matrices 23,43, for example as disclosed in U.S. Pat. No. 4,900,126, which is hereby incorporated by reference herein in its entirety.

According to the present invention, the respective thicknesses of common matrices 24,44 are minimized to increase the adhesion of the common matrix to the subunit matrix, and to decrease the cohesive strength of the common matrix relative to the subunit matrix. The thickness t (FIG. 2) of common matrix 24 is up to about 25 $\mu$m with a preferred range of about 5 $\mu$m to 10 $\mu$m, as disposed over a subunit thickness of about 2 $\mu$m to about 75 $\mu$m or more.

Optical fiber ribbons made in accordance with the present invention will have a controlled subunit/common matrix modulus ratio. The subunit/common matrix modulus ratio is accomplished by selecting suitable UV curable materials and controlling the UV radiation that they are exposed to in the curing process so that the desired modulus characteristics are attained. Preferably, the modulus characteristics of each cured matrix are unequal. In other words, the common matrices 24,44 are less rigid than respective subunit matrices 23,43. More specifically, UV curable materials, radiation sources, and process parameters are selected so that the subunit/common matrix modulus ratio is in the range of about 1.5:1 to about 60:1. The subunit/common matrix modulus ratio can be defined as a ratio of the subunit matrix modulus with respect to the common matrix modulus. More preferably, the subunit/common matrix modulus ratio is in the range of about 2.3:1 to about 25:1. Most preferably, the subunit/common matrix modulus ratio is in the range of about 18:1, i.e., about 900 MPa:50 MPa. The foregoing ranges assure that the cohesive strength between common matrices 24,44 and respective subunit matrices 23,43 is such that during a subunit separation procedure the common matrix should fail prior to fracture of the subunit matrix.

In addition to modulus characteristics, common matrices 24,44 exhibit good friction characteristics. A suitable UV curable material minimizes the static COF ($\mu_{static}$) of the common matrix in order to reduce stress induced attenuation caused by subunit separation with a tool. The optimal $\mu_{static}$ range is less than or equal to about 1.0. Further, ribbon matrices 23,43 can include an additive for reducing COF, such as is disclosed in commonly assigned U.S. Pat. No. 5,561,730, which is incorporated by reference herein in its entirety. U.S. Pat. No. 5,561,730 also discloses a suitable method for determining the value of $\mu_{static}$.

Several methods according to the present invention can be used to define adhesion zones 28,48, shown schematically in FIGS. 2A,3A, between subunit matrices 23,43 and respective common matrices 24,44. For example, on a molecular level, adhesion zones 28,48 can be formed by oxidation of the outer surfaces of subunit matrices 23,43 and subsequent application and curing of common matrices 24,44. Alternatively, adhesion zones 28,48 can be formed by application of a bonding treatment and subsequent application and curing of common matrices 24,44. The function of adhesion zones 28,48 is to establish a controlled adhesion between the common and subunit matrices that is robust enough to inhibit inadvertent separation and the formation of wings during subunit separation. On the other hand, the controlled adhesion is delimited so as to avoid breakage of any subunit matrix during subunit separation, thereby avoiding the formation of stray fibers.

A Corona discharge treatment can be applied to the surface of subunits 26,46. The present invention contemplates the use of a conventional Corona treatment device in forming adhesion zones 28,48. The Corona treatment can include a process whereby subunits 26,46 are, after curing by UV radiation, passed over a grounded conductor. A high voltage electrode is located above the conductor and is spaced so as to leave a small air gap between the subunits and the electrode. The Corona discharge oxidizes the matrix material and forms polar groups/reactive sites on the subunit matrix material. The common matrices 24,44 bond with the reactive sites during application and UV curing thereof. Adhesion zones 28,48 comprise the bond layer of the oxidized outer surface of subunits 26,46 with respective reactive sites on common matrices 24,44.

Adhesion zones 28,48 can also comprise a bonding treatment including photoinitiators and/or monomers that are diluted or taken into solution with a solvent. The bonding treatment is applied to subunits 26,46 in a very thin, evenly distributed layer. The bonding treatment can be a UV acrylate material combined with a photoinitiator. Preferably the photoinitiator has a high absorption rating of approximately 250 nm for high energy activation with an H-bulb, e.g., an alpha-hydroxy ketone material, for example DAROCURE 1173 (HMPP), IRGACURE 184 (HCPK) with benzophenone derivatives, or IRGACURE 500 (HCPK/BP) made commercially available by Ciba. Once the photoinitiator is activated, it combines with respective unreacted sites in subunit matrices 23,43 and makes the sites reactive.

Common matrices 24,44 are then respectively applied thereover and irradiated with common matrices 24,44 upon irradiation with a UV light source.

Alternatively, the bonding treatment can comprise a monomer, for example, a 2-(Ethoxyethoxy) Ethyl Acrylate with Dipentaerythritol Pentaacrylate, that is taken into solution with a solvent, e.g., acetone, or a non-flammable solvent. This monomer-based bonding treatment can be operative to permeate the subunit matrix material and gain a good molecular grip thereinto. The monomer-based bonding treatment also provides a site for reacting with the common matrix material 24,44. In addition, the bonding treatment can be a mixture of a photoinitiator and a monomer taken into a common solution.

The bonding treatment can be applied with a die, wiped on, applied as a mist, or applied by any other appropriate method onto subunits 26,46. The bonding treatment can be partially or completely cured with a UV light source prior to application of the common matrix. Preferably the bonding treatment forms a thickness of about 5 $\mu$m or less. The bonding treatment can be applied in-line with application of the common matrix material; however, it is contemplated that the bonding treatment can be applied in an off-line process as well.

To enhance the absorbance of common matrices 24,44, subunit matrices 23,43, and/or the bonding treatment, the formulations thereof may include at least one conventional UV absorber additive. UV absorbers act by absorbing incident light and converting it to heat energy. The use of a UV absorber, however, may reduce cure speed of the formulation—to counter this, the addition or increased concentration of photoinitiator in the formulation may be appropriate. Suitable UV absorbers are disclosed in U.S. Pat. No. 4,482,224, which is incorporated by reference herein. Another suitable UV absorber is sold under the trade name TINUVIN, made commercially available by Ciba.

In view of the foregoing and in general, a method of manufacturing an optical fiber array can comprise the steps of:

(a) supplying at least one subunit including at least one optical fiber therein surrounded by a respective subunit matrix;

(b) creating a common matrix adjacent to the at least one subunit and curing the common matrix so that a common matrix modulus of the common matrix is less than a subunit matrix modulus of the subunit matrix; and (c) prior to and during formation of the common matrix, defining an adhesion zone between the common and subunit matrices that is robust enough to inhibit inadvertent separation of the subunit but is weak enough to minimize breakage of the subunit matrix during subunit separation.

The step of defining the adhesion zone can include oxidizing an outer surface of the subunit matrix. The oxidation can be accomplished by Corona treatment of the subunit matrix. The step of defining the adhesion zone can include reacting the common matrix with polar groups made by an oxidation of the outer surface of the at least one subunit. In addition, the step of defining the adhesion zone can include applying and curing a bonding treatment, and subsequent application and curing of the common matrix. The step of defining the adhesion zone can include, in combination, the steps of oxidizing an outer surface of the subunit and applying a bonding treatment thereto.

The present invention has thus been described with reference to the foregoing embodiments, which embodiments are intended to be illustrative of the inventive concepts rather than limiting. Skilled artisans will appreciate that variations and modifications of the foregoing embodiments may be made without departing from the scope of the appended claims. For example, the inventive concepts can encompass non-planar optical fiber arrays, for example, a low modulus matrix in a cylinder such as a blown fiber subunit. Additionally, the optical fiber array can be, for example, a bundle of optical fibers connected by a subunit matrix and surrounded by a common matrix according to the present invention. In another contemplated variation, UV curable acrylates can be replaced by thermoplastics including, for example, PVC, PE, SEBS, and/or PP. The present inventive concepts can be used in the formation of ribbon stacks so that two or more optical fiber ribbons in a stack are bonded together with a low modulus matrix material. Additionally, the concepts of the present invention are applicable to multi-core optical fibers.

Further, optical fiber ribbons can be prepared having subunits with any number of optical fibers therein, for example, one to thirty-six optical fibers or more. An optical fiber array (not shown) can be prepared having at least one optical fiber ribbon with at least two optical fibers therein surrounded by a respective first matrix having a subunit matrix modulus; a second matrix disposed adjacent to the at least one subunit having a matrix modulus; the subunit matrix modulus being unequal to the second matrix modulus whereby the second matrix is less rigid than the first matrix. Moreover, oxidation of the subunit outer surface can be accomplished with a flame treatment or exposure to UV radiation. Further, adhesion zones 28,48 can be formed by a combination of oxidation of the subunit surfaces and application of a bonding treatment.

Accordingly, what is claimed is:

1. A method of manufacturing an optical fiber array comprising the steps of:

(a) supplying at least one subunit including at least one optical fiber therein surrounded by a respective subunit matrix;

(b) creating a common matrix adjacent to the at least one subunit and curing the common matrix so that a common matrix modulus of the common matrix is less than a subunit matrix modulus of the subunit matrix; and (c) prior to and during formation of the common matrix, defining an adhesion zone between the common and subunit matrices that is robust enough to inhibit inadvertent separation of the subunit but is weak enough to minimize breakage of the subunit matrix during subunit separation.

2. The method of claim 1, the step of defining said adhesion zone including oxidizing an outer surface of said subunit matrix.

3. The method of claim 2, the oxidation being accomplished by Corona treatment of said subunit matrix.

4. The method of claim 1, the step of defining said adhesion zone including reacting the common matrix with polar groups made by an oxidation of the outer surface of the at least one subunit.

5. The method of claim 1, the step of defining said adhesion zone including applying and curing a bonding treatment, and subsequent application and curing of the common matrix.

6. The method of claim 1, the step of defining said adhesion zone including the steps of oxidizing an outer surface of the subunit and applying a bonding treatment thereto.

* * * * *